D. J. ROUSH.
POTATO-DIGGER.

No. 169,483. Patented Nov. 2, 1875.

WITNESSES:
Chas. Nida
A. F. Terry

INVENTOR:
BY D. J. Roush
ATTORNEYS.

UNITED STATES PATENT OFFICE.

DAVID J. ROUSH, OF SYRACUSE, OHIO.

IMPROVEMENT IN POTATO-DIGGERS.

Specification forming part of Letters Patent No. 169,483, dated November 2, 1875; application filed July 17, 1875.

*To all whom it may concern:*

Figure 1:
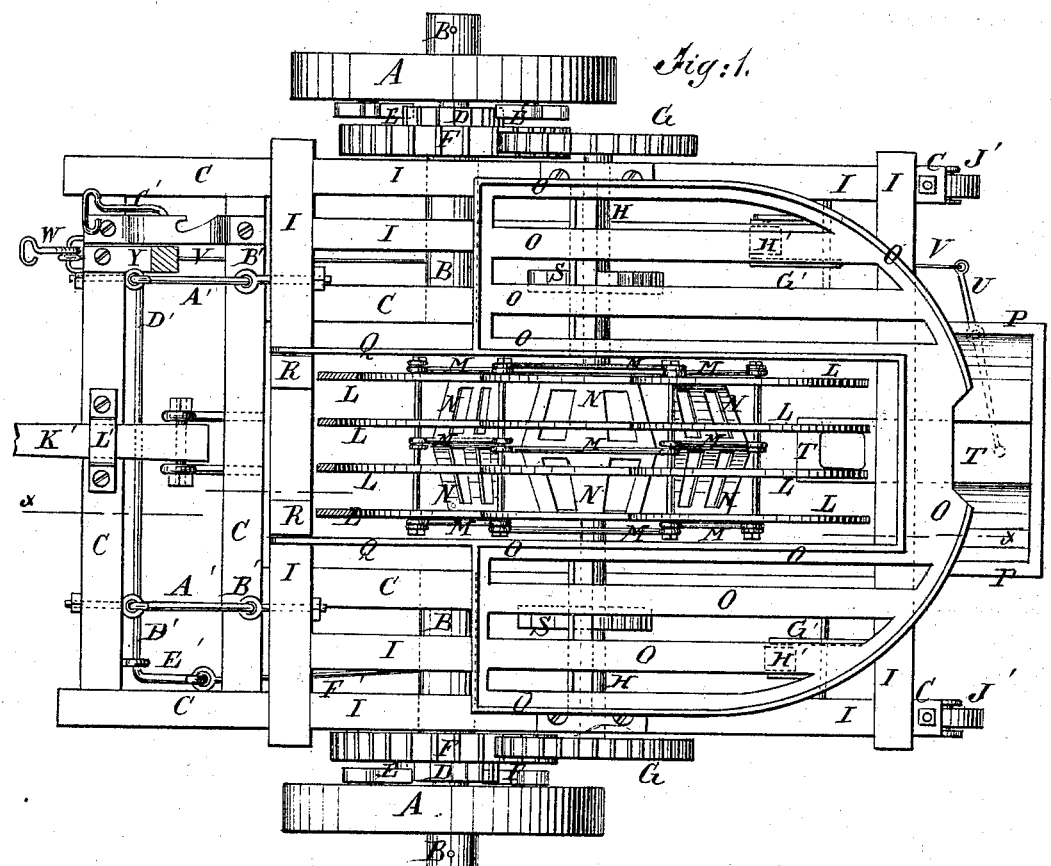
Figure 2:
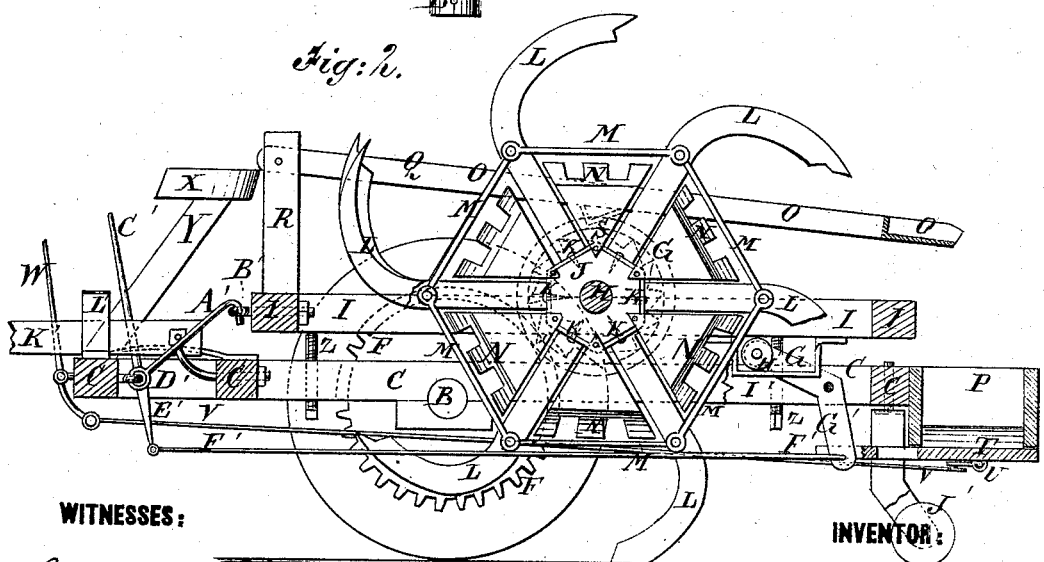

Be it known that I, DAVID J. ROUSH, of Syracuse, in the county of Meigs and State of Ohio, have invented a new and useful Improvement in Potato-Digger, of which the following is a specification:

Figure 1 is a top view of my improved potato-digger. Fig. 2 is a vertical longitudinal section of the same, taken through the line $x$ $x$, Fig. 1.

Similar letters of reference indicate corresponding parts.

The invention will first be described in connection with drawing, and then pointed out in the claims.

A are the main or drive wheels, which are rigidly attached to the outer ends of the short axles B. The axles B revolve in bearings attached to the longitudinal bars of the frame C. Upon the axles B at the inner side of the wheels A are placed loose ratchet-wheels D, with the teeth of which engage spring-pawls E attached to the drive-wheels A, so that the said drive-wheels A may carry the said ratchet-wheels D with them in their revolution when the machine is drawn forward, but will not carry said ratchet-wheels with them when turned backward. With the ratchet-wheels D are rigidly connected the large gear-wheels F, into the teeth of which mesh the teeth of the gear-wheels G, rigidly attached to the ends of the shaft H. The shaft H revolves in bearings attached to the frame I, placed above the frame C. To the middle part of the shaft H, and at a suitable distance apart, are attached two small polygonal wheels, J, to the faces of which are attached the ends of the bars K. To the bars K are attached the inner ends of the fingers L, which are curved, as shown in Fig. 2, and the outer fingers of each set are made with a flange upon the inner or concave side to prevent the potatoes from rolling off while being raised. To the middle parts of the fingers L are attached rods M, which brace the said fingers, and, at the same time, serve as a screen to separate the stalks, grass, weeds, and other rubbish from the potatoes and soil. N are screens placed between the rows of fingers L, and which incline from the middle part toward each end. The ends of the screens N are bent inward, and are attached to the wheels J. The inclined parts of the screens N have openings formed in them to allow the soil to pass through, while the potatoes roll down the said screens N and fall into the screen O, which passes around the sides and rear part of the digging-wheel, and has flanges formed along its edges to prevent the potatoes from rolling off. The outer flange, at the rear end of the screen O, is cut away to allow the potatoes to fall into a box, P, attached to the rear cross-bar of the frame C. To the forward end of the screen O are rigidly attached two arms, Q, the forward ends of which are pivoted to two standards, R, attached to the front cross-bar of the frame I. The screen O rests upon the teeth of the ratchet-wheels S, attached to the shaft H, so that it may be jarred by the advance of the machine to shake off any soil that may adhere to the potatoes and to cause the potatoes to pass back to the rear end of the screen and fall into the box P. The middle part of the bottom of the box P is formed by a slide, T, which has a hole formed in its forward part, so that when pushed back to bring the said hole within the said box the potatoes may flow out into a heap or into any desired receiver. U is a lever, which is pivoted to the stationary part of the bottom of the box P, and its end passes through a staple or eyebolt attached to the slide T. To the other end of the lever U is pivoted the rear end of the long connecting-rod V, which extends forward beneath the frame C, and its forward end is pivoted to the lower end of the lever W. The lever W is pivoted to the front cross-bar of the frame C, and its upper end projects into such a position that it may be reached and operated by the driver from his seat X, the standard Y of which is attached to the forward pard of the frame C. The digger-frame I rests upon the upper ends of the four set-screws Z, which pass up through screw-holes in the side bars of the frame C, so that by turning the said screws up or down the digger-frame I may be raised or lowered to cause the fingers L to work shallower or deeper in the ground, as circumstances may require. The draft-strain upon the digger-frame I is sustained by the hooks A', which are pivoted to the front cross-bar of the frame C, and hook into the eyes of eyebolts B', attached to the front cross-bar of the digger-frame I. The eyebolts B' are made long, so that by adjusting their nuts the frame I may be adjusted to cause the gear-wheels G to properly mesh into the gear-wheels F, however the said frame I may be raised and lowered. C' is a lever, formed upon or attached to the shaft D', that works in bearings attached to the front cross-bar of the frame C, and has downwardly-projecting crank-arms E' formed upon, or attached to, its ends. To the lower ends of the crank-arms E' are pivoted the forward ends of the connecting-rods F', the rear ends of which are pivoted to the lower ends of the bent levers G'. The levers G' are pivoted to the frame C, are forked or branched, and to and between the parts of their forward ends are pivoted small rollers H', which roll along the under side of the side bars of the frame I, and are kept in place by keepers I', atached to the said side bars, and within which the said rollers work. By this construction, by operating the lever C', the rear part of the frame I may be raised to raise the fingers L away from the ground, and, at the same time, to throw the gear-wheels G out of gear with the gear-wheels F for convenience in turning around and passing from place to place. The rear end of the machine is supported by the caster-wheels J', which are pivoted to the rear corners of the frame C. K' is the tongue, which is pivoted to eye-bolts attached to the inner front cross bar of the frame C. The tongue K' passes through a keeper, L', attached to the outer front cross-bar of the frame C, and which is made considerably higher than the thickness of the tongue K', so that there may be sufficient play to allow the machine to accommodate itself to irregular surface of ground.

Having thus described my invention, I claim as new and desire to secure by Letters Patent—

1. The combination of the screen O and the ratchet-wheels S with the digging-wheel L M N, the shaft H, and the frame I, substantially as herein shown and described.

2. The combination of the levers U W, and the connecting-rod V, with the slide T of the receiving-box P, attached to the frame C, substantially as herein shown and described.

3. The combination of the set-screws Z, the hooks A', and the adjustable eye-bolts B', with the carriage-frame C, the digger-frame I, and the gear-wheels F G, by which the digger-wheel L M N is driven, substantially as herein shown and described.

4. The combination of the lever C, the crank-shaft D' E', the connecting-rods F', the forked levers G', the rollers H', and the keepers I', with the carriage-frame C, and the digger-frame I, substantially as herein shown and described.

DAVID JONES ROUSH.

Witnesses:
J. M. WELDON,
H. H. BLACKMORE.